US006603508B1

(12) United States Patent
Hata

(10) Patent No.: US 6,603,508 B1
(45) Date of Patent: Aug. 5, 2003

(54) METHOD, SYSTEM, AND COMPUTER READABLE MEDIUM FOR CONTROLLING A DIGITAL CAMERA TO AVOID BLURRING OF A PHOTOGRAPH

(75) Inventor: Daisuke Hata, Kawaguchi (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/188,327

(22) Filed: Nov. 9, 1998

(30) Foreign Application Priority Data

Nov. 19, 1997 (JP) .............................................. 9-336395

(51) Int. Cl.⁷ ........................ H04N 5/235; H04N 5/228
(52) U.S. Cl. .............................. 348/229.1; 348/208.12; 348/208.16
(58) Field of Search ................................ 348/208, 229, 348/333.02, 333.04, 371, 367, 363, 229.1, 208.12, 208.16

(56) References Cited

U.S. PATENT DOCUMENTS

| 4,884,144 A | * | 11/1989 | Jinnai et al. ............. 348/229.1 |
| 5,610,654 A | * | 3/1997 | Parulski et al. ............. 348/229 |
| 5,751,348 A | * | 5/1998 | Inuiya et al. ............... 348/371 |
| 5,877,810 A | * | 3/1999 | Inuiya et al. ............... 348/229 |
| 5,883,666 A | * | 3/1999 | Kyuma et al. ............. 348/229 |
| 6,091,448 A | * | 7/2000 | Washisu et al. ............. 348/208 |

FOREIGN PATENT DOCUMENTS

JP          4-57481          2/1992

* cited by examiner

Primary Examiner—Wendy R. Garber
Assistant Examiner—Lin Ye
(74) Attorney, Agent, or Firm—Oblon, Spivak, McClelland, Maier & Neustadt, P.C.

(57) ABSTRACT

A method, system and computer readable medium for controlling a digital camera including setting a shutter speed; receiving a light flux from an object to be photographed to form an image thereof at the set shutter speed; converting the received light flux into an image signal; amplifying the image signal with a variable gain; judging whether or not the shutter speed is set slower than a predetermined blur avoiding speed; and increasing the variable gain to a predetermined value when the shutter speed is set slower than the predetermined blur avoiding speed. Another embodiment includes a method, system and computer readable medium for controlling a digital camera including setting a shutter speed; receiving a light flux from an object to be photographed to form an image thereof at the set shutter speed; converting the received light flux into an image signal; amplifying the image signal with a variable gain; judging whether or not the shutter speed is set slower than a predetermined blur avoiding speed; selectively setting a photographing mode to one of: a blur avoiding photographing mode in which the variable gain is increased to a predetermined value when the shutter speed is set slower than the predetermined blur avoiding speed, and a normal photographing mode in which the variable gain is not increased even when the shutter speed is set slower than the predetermined blur avoiding speed; and increasing the variable gain to a predetermined value when the blur avoiding photographing mode is set and when the shutter speed is set slower than the predetermined blur avoiding speed.

36 Claims, 7 Drawing Sheets

METHOD, SYSTEM, AND COMPUTER READABLE MEDIUM FOR CONTROLLING A DIGITAL CAMERA TO AVOID BLURRING OF A PHOTOGRAPH

BACKGROUND OF THE INVENTION

1. Field of the Invention

The present invention relates to a digital camera, and more particularly to a digital camera that avoids blurring of a photograph which may be caused by movement of the camera when the photograph is taken.

2. Discussion of the Background

As digital cameras for taking a high quality photographs continue to improve, the demand for avoiding blurring of photographs due to camera movement is accordingly increasing. Japanese Patent Laid-Open Publication No. 58481/1992 describes a related digital video camera having a blur compensating device for compensating for blurring of a photograph caused by movement of the camera when the photograph is taken. The video camera of JP No. 58481/1992 includes a solid-state imager with a variable speed shutter, a shutter speed control device which changes a shutter speed of the imager, and a control device which synchronously controls the blur compensating device and the shutter speed control device. The digital video camera is configured such that the shutter speed is changed in cooperation with an operation of the blur compensating device and thereby the degradation of an image resolution of the photograph due to the blurring is avoided.

However, the electronic circuit for the blur compensating device of JP 58481/1992 is rather complicated, and the constitution of the digital video camera is complicated due to this circuit. As a result, the cost of the camera is increased, and moreover the size of a body of the camera is relatively large. In addition, power consumption of the camera is increased due to this circuit, which inevitably reduces the battery duration time for the camera.

SUMMARY OF THE INVENTION

Accordingly, it is an object of the present invention to provide a novel and improved digital camera that avoids blurring of a photograph which may be caused by movement of the camera when the photograph is taken with a simple constitution at a low cost.

It is another object of the present invention to reduce the power consumption of the camera for enabling a long battery operation of the camera with a compact body.

It is another object of the present invention to simplify the structure of a blur compensating device for a digital camera for decreasing the overall body size of the camera, for reducing the power consumption of the camera so as to enable a longer duration time with the battery operation, and for reducing the production cost of the camera.

The above and other objects are achieved according to the present invention by providing a new and improved method, system and computer readable medium for controlling a digital camera including setting a shutter speed; receiving a light flux from an object to be photographed to form an image thereof at the set shutter speed; converting the received light flux into an image signal; amplifying the image signal with a variable gain; judging whether or not the shutter speed is set slower than a predetermined blur avoiding speed; and increasing the variable gain to a predetermined value when the shutter speed is set slower than the predetermined blur avoiding speed.

Another embodiment includes a method, system and computer readable medium for controlling a digital camera including setting a shutter speed; receiving a light flux from an object to be photographed to form an image thereof at the set shutter speed; converting the received light flux into an image signal; amplifying the image signal with a variable gain; judging whether or not the shutter speed is set slower than a predetermined blur avoiding speed; selectively setting a photographing mode to one of: a blur avoiding photographing mode in which the variable gain is increased to a predetermined value when the shutter speed is set slower than the predetermined blur avoiding speed, and a normal photographing mode in which the variable gain is not increased even when the shutter speed is set slower than the predetermined blur avoiding speed; and increasing the variable gain to a predetermined value when the blur avoiding photographing mode is set and when the shutter speed is set slower than the predetermined blur avoiding speed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
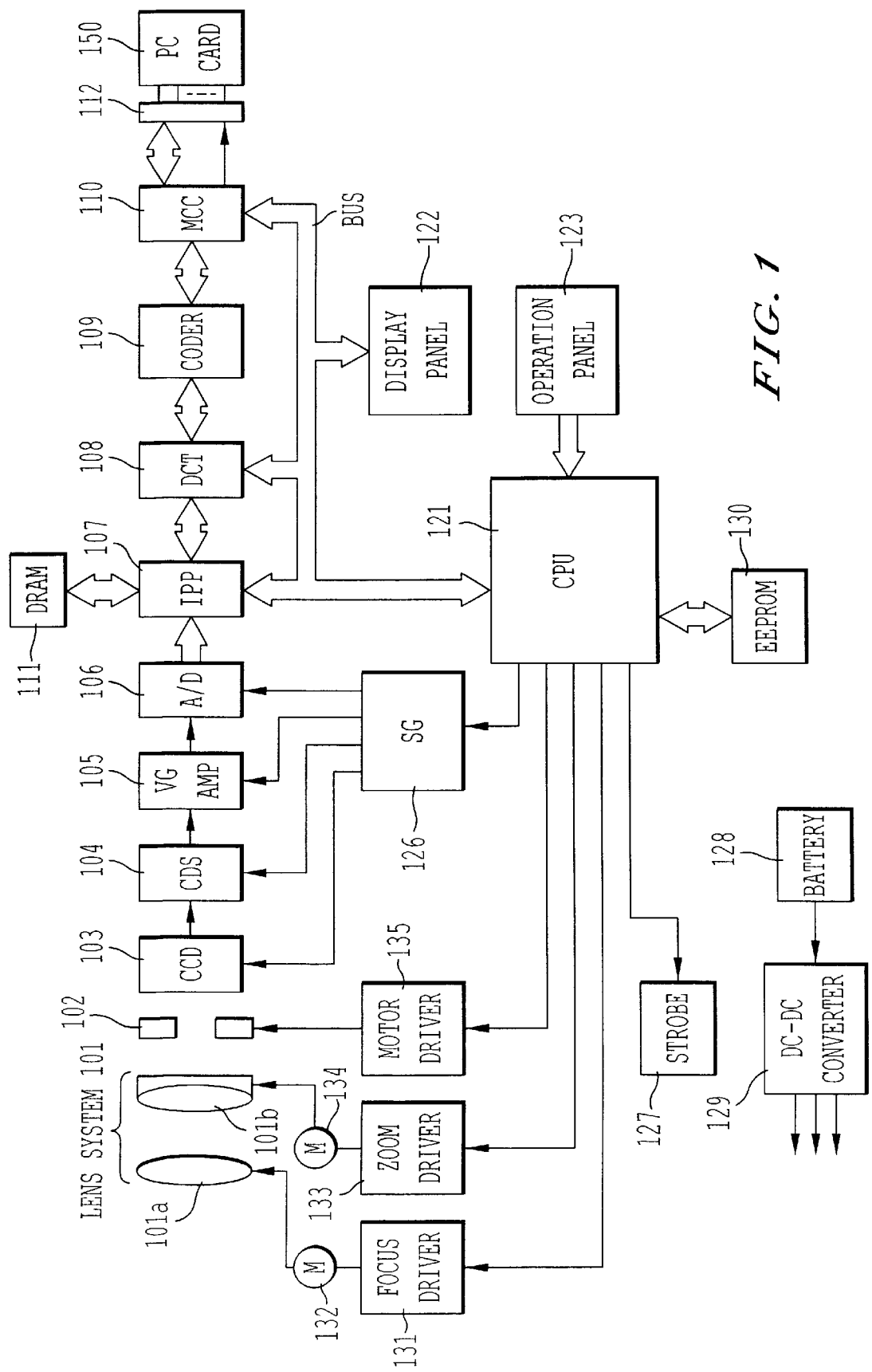
FIG. 1 is a block diagram illustrating the structure of an exemplary digital camera according to the present invention.

While the present invention will hereinafter be described in connection with preferred embodiments thereof, it will be understood that it is not intended to limit the invention to these embodiments. On the contrary, it is intended to cover all alternatives, modifications and equivalents wherein the spirit and scope of the invention are included. Furthermore, in the drawings, like reference numerals have been used throughout the drawings to identify identical elements.

FIG. 1 shows an example of the overall construction of a digital camera to which the present invention is applied. A digital camera 100 includes a lens system 101, an optic mechanical system 102 including an aperture, a filter, and so forth, a charge coupled device (CCD) 103 as an imaging device, a correlate dual sampling (CDS) circuit 104, a variable gain control (VG) amplifier 105, an analog to digital (A/D) converter 106, an image pre-processor (IPP) 107, a discrete cosine transformer (DCT) 108, a Huffman encoder/decoder 109, a memory card controller (MCC) 110, a dynamic random-access memory (DRAM) 111, a memory card interface circuit 112, a central processing unit (CPU) 121, a display panel 122, an operation panel 123, a device control signal generator (SG) 126, a strobe flash 127, a battery 128, a DC-DC converter 129, an electrical erasable programmable read only memory (EEPROM) 130, a focus driver 131, a stepping motor 132 for focusing, a zoom driver 133, a stepping motor 134 for zooming, and a motor driver 135. A memory card 150 can be attached to the camera 100 via the memory card interface circuit 112, and an optional remote control unit (not shown) may be included in the camera 100.

The lens unit of the camera 100 includes the lens system 101 and the optic mechanical system 102. An electronically controlled mechanical shutter that is provided inside the optic mechanical system 102 simultaneously exposes both of two interlaced field images to form a complete raster image of the two field images. The lens system 101 comprises, for example, a variable focal lens which is composed of a focus lens 101a and a zoom lens 101b.

The focus driver 131 drives the stepping motor 132 for focusing according to a control signal provided by the CPU 121 to move the focal lens 101a along its optical axis. The zoom driver 133 drives the stepping motor 134 for zooming in accordance with a control signal provided by the CPU 121 to move the zoom lens 101b along its optical axis. The motor driver 135 drives the optic mechanical system 102 according to a control signal provided by the CPU 121, for example, to set an aperture value.

The CCD imaging device 103 converts optical images, which are input thereto via the lens unit, into analog electrical signals. The CDS circuit 104 reduces noise of the analog electrical signals, and thereby enhances the image quality resulting from the electrical signals. The CDS circuit 104 is particularly tuned to reduce inherent CCD sensor noises, such as thermal noise.

The VG amplifier 105 corrects the amplitude of an analog electrical signal that has been processed by the CDS circuit 104 into a predetermined amplitude. The gain level of the VG amplifier 105 is set by the CPU 121. The CPU 121 first reads digital data, which is provided inside the EEPROM 130 and which defines a relation between a control voltage and a measured gain of the VG amplifier 105, and inputs the read data to a digital to analog (D/A) converter (not shown) built in the CPU 121 to convert the read data to an analog voltage, which is then set at the VG amplifier 105. The A/D converter 106 converts the analog image data from the VG amplifier 105 into digital image data. The A/D converter 106 converts the data with an optimum sampling frequency, such as, for example, a multiple number of the sub-carrier frequency of the NTSC signal format.

The IPP 107, the DCT 108, and the Huffman encoder/decoder 109, functioning as a digital signal processor, separate the digital data which is input from the A/D converter 106 into color-difference data and luminance data, and then perform various processes on the separated data including processes for correcting and converting the separated data into optimum data for compression/decompression. The Huffman encoder/decoder 109 carries out, for example, an orthogonal transformation and a Huffing encoding/decoding for the original digital data, which are required in data compression and expansion in the Joint Photographic Expert Group (JPEG) standard.

The memory card controller (MCC) 110 temporarily stores encoded data therein and then writes the data in the memory card 150 through the memory card interface circuit 112. The MMC 110 also reads out stored data from the memory card 150.

The CPU 121 controls operation of the camera 100 according to instructions input through the operation panel 123 or from the outside of the camera 100, for example, through the optional remote control unit (not shown). The CPU 121 executes the control of the operation of the camera 100 in accordance with a series of program codes (instructions), which are stored in a ROM (not shown) internal to the CPU 121, using a RAM (not shown) internal to the CPU 121 as a working area. More specifically, the CPU 121 controls a photographing operation, an automatic exposure (AE) control operation, an automatic white balancing (AWB) operation, and an automatic focusing (AF) operation.

Power to the camera 100 is input to the DC to DC converter 129 from the battery 128, which includes, for example, a nickel cadmium battery, a nickel hydrogen battery, or a lithium battery. The voltage is converted to an appropriate level by the DC to DC converter 129 and then supplied to the entire camera 100 system.

The display panel 122 includes, for example, a liquid crystal display, a light emitting diode display or an electronic luminescence display, etc. The display panel 122 displays an image of digital image data of a photograph just taken or an image of image data which is compressed and stored in the memory card 150. The operation panel 123 is provided with a plurality of buttons for selecting desired functions and inputting instructions for setting photographing conditions. In addition, the EEPROM 130 contains parameters which the CPU 121 uses in executing the above-mentioned controls.

The camera 100 provides three operational modes, for example, including a monitoring mode, a photographing/recording mode and a displaying mode. The monitoring mode enables displaying an image photographed by the CCD 103 in the display panel 122 before recording the image in the memory card 150 and setting either the blur avoiding photographing mode or the normal photographing mode. The photographing/recording mode enables photographing an image either with the blur avoiding photographing mode or the normal photographing mode and storing resulting image data into the memory card 150. The blur avoiding photographing mode enables photographing an image while avoiding blurring of a photograph due to movement of the camera by increasing the gain of the VG amplifier 105. The normal photographing mode enables photographing an image without increasing the gain of the VG amplifier 105. The displaying mode enables reading out of stored image data from the memory card 150 and displaying images of the data on the display panel 122.

Figure 2:
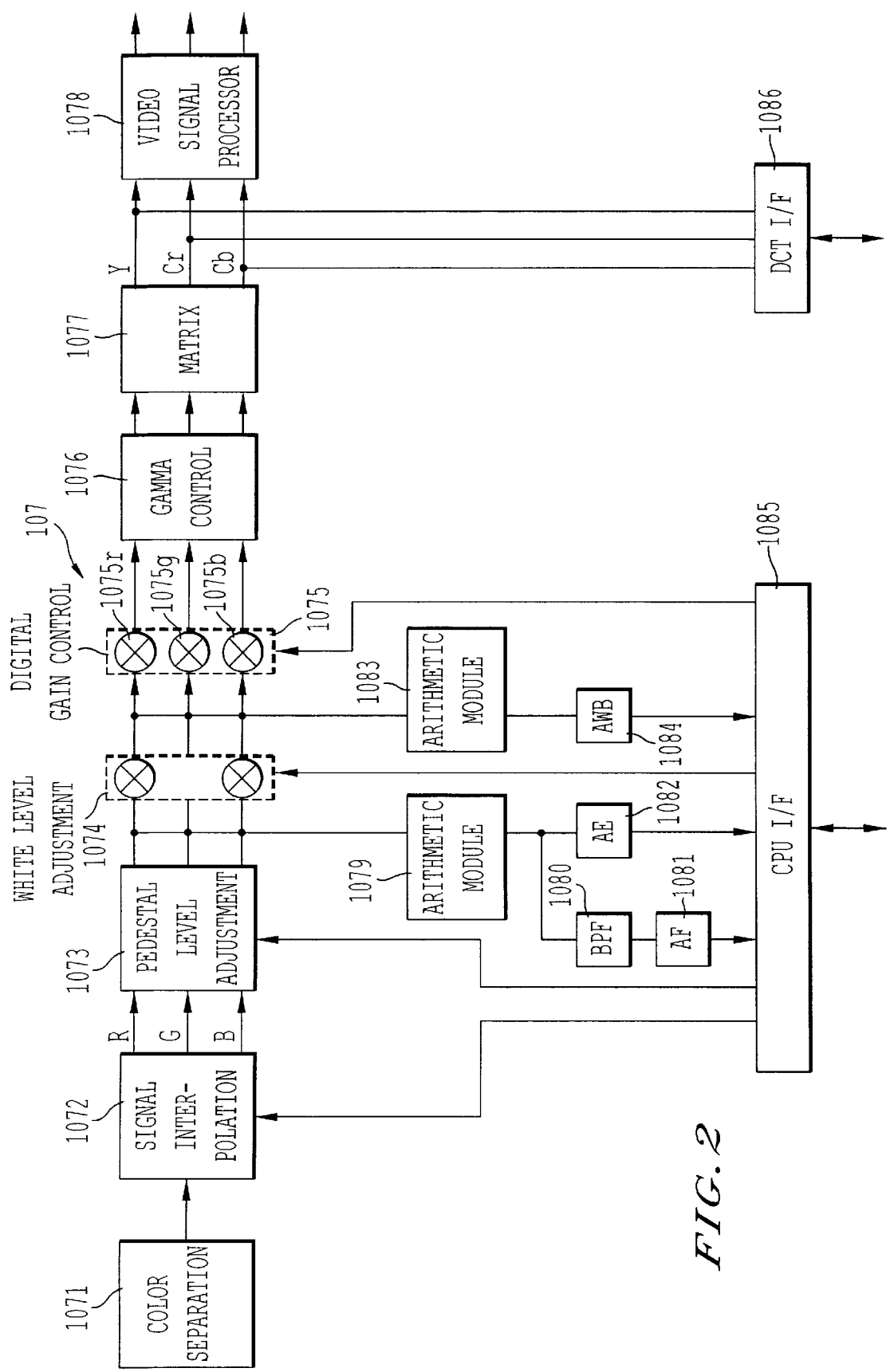
FIG. 2 is a block diagram illustrating an example of an image pre-processor of the camera shown in FIG. 1.

FIG. 2 is a block diagram illustrating an example of the image pre-processor (IPP) 107. A color separation module 1071 separates digital image data from the A/D converter 106 into a set of red (R), green (G), and blue (B) data. A signal interpolation module 1072 interpolates new data in each of the separated R, G, and B data. A pedestal level adjustment module 1073 adjusts a black level of each of the R, G, and B data. A white level adjustment module 1074 adjusts a white level of each of the R, G, and B data. A digital gain control module 1075 adjusts a signal level of each of the R, G, and B data with a gain which is set by the CPU 121. A gamma control module 1076 converts a gamma of each of the R, G, and B data into another gamma. A matrix module 1077 converts the set of R, G, and B data into color-difference signals (Cb and Cr) and a luminance signal (Y). A video signal processing module 1078 converts the Cb, Cr, and Y signals into NTSC format video signals, respectively, and sends out these signals to the display panel 122.

A first arithmetic module 1079 detects the intensity of a luminance signal which is output from the pedestal level adjustment module 1073. A band pass filter (BPF) 1080 passes a specific frequency band of the luminance signal detected by the first arithmetic module 1079. An automatic focus (AF) evaluation circuit 1081 calculates the integral of digital values according to the luminance signals passed the BPF 1080, and outputs the integral to the CPU 121 as an AF evaluation value. An automatic exposure (AE) evaluation circuit 1082 calculates a digital value (described below) according to the intensity of the luminance signal which is detected by the first arithmetic module 1079 and outputs the value to the CPU 121 as an AE evaluation value. An AE evaluation value represents a difference between the exposure value for an optimum exposure for the sensitivity of the CCD 103 and the exposure value according to the time value (shutter speed) and the aperture value arbitrarily set in an automatic exposure operation. A second arithmetic module 1083 detects the intensity of a luminance signal of each of the R, G, and B data which is adjusted by the white level adjustment module 1074. An automatic white balance (AWB) evaluation circuit 1084 counts each of the luminance data of R, G, and B and outputs the data to the CPU 121 as an AWB evaluation value for each color. A CPU interface circuit 1085 is an interface between the IPP 107 and the CPU 121. A DCT interface circuit 1086 works as an interface between the IPP 107 and the DCT 108.

The AE evaluation circuit 1082 calculates the AE evaluation value by means of a weighted calculation of luminance values of a set of six luminance areas of a light receiving area of the CCD 103. More specifically, the first arithmetic module 1079 outputs luminance data for each picture element (pixel) of an image received by the CCD 103 to the AE evaluation circuit 1082. The AE evaluation circuit 1082 adds up the received pixel luminance data for each of the six areas to obtain a luminance value for each area. The AE evaluation circuit 1082 then performs a weighted calculation of the set of six luminance values for six areas to obtain a calculated value as the AE evaluation value for the image received by the CCD 103.

Figure 3:
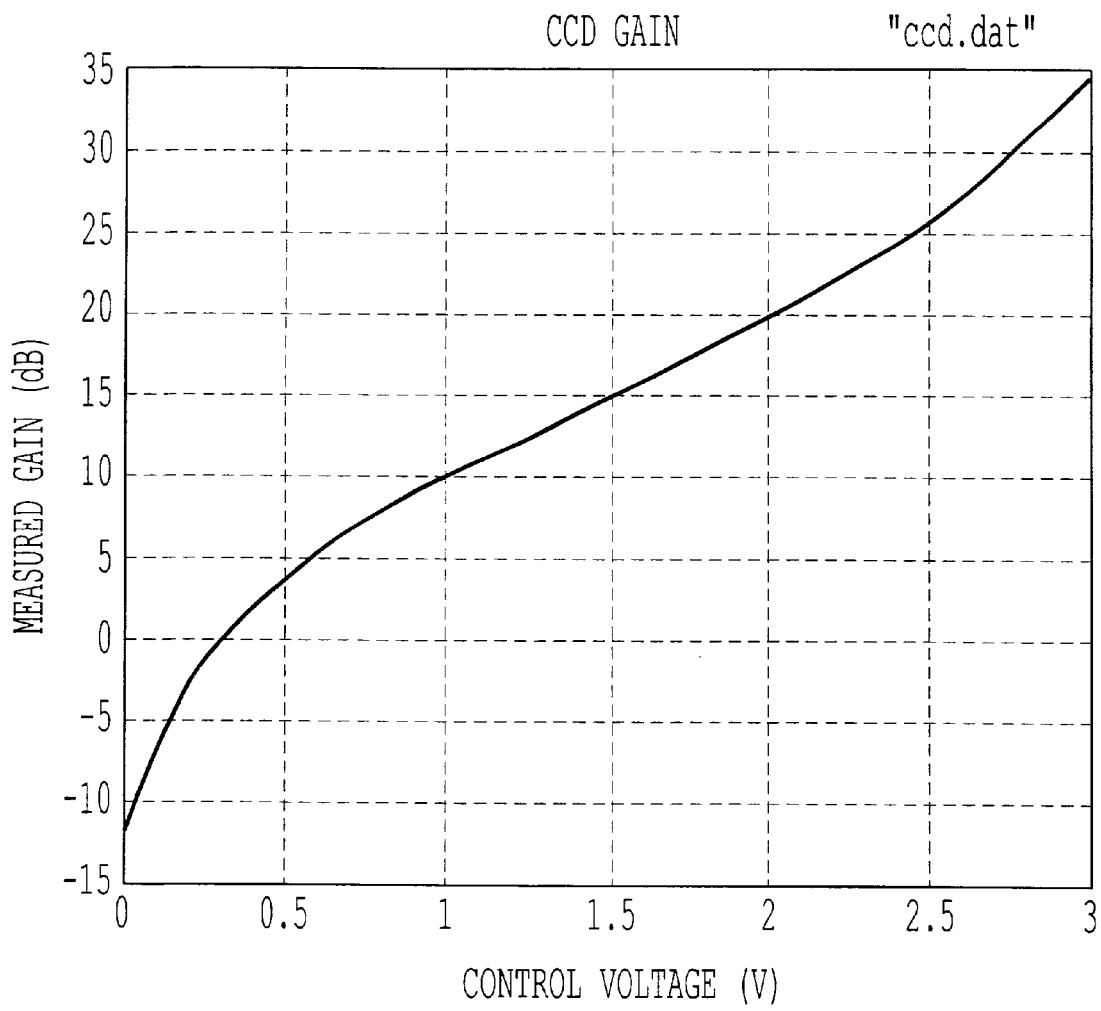
FIG. 3 is a graph illustrating a relation between a control voltage and a measured gain of a variable gain amplifier of the camera shown in FIG. 1.

FIG. 3 is a graph illustrating a relation between a control voltage and a measured gain of the VG amplifier 105. The horizontal axis represents the control voltage and the vertical axis represents the measured gain of the VG amplifier 105, respectively. The data representing this relation is stored in the EEPROM 130.

Next, an example of an automatic exposure (AE) control operation according to the present invention is described. Specifically, in the AE control operation, the CPU 121 controls the shutter speed of the CCD 103 or the gain of the VG amplifier 105 such that the AE evaluation value calculated as described above becomes a criterion value for an optimum exposure.

The automatic exposure (AE) control operation will be described for each of the monitoring mode, the normal photographing mode, and the blur avoiding photographing mode referring to a specific exposure value (Ev) diagram for each mode. For simplifying the explanation, for example, the aperture is fixed such that f-number is four or an aperture value (Av) equals four.

An exposure value (Ev) diagram is used for illustrating the combination of a time value (Tv) defining the shutter speed and an aperture value (Av) defining the size of an opening of an aperture, with which a goal exposure value (Ev), which defines an optimum amount of light to expose a film or to be received by an imaging device such as the CCD 103, can be obtained. These three values have a relation satisfying the following equation:

$$Ev=Av+Tv$$

Furthermore, a light value (Lv) is a measured intensity of the light of an image to be photographed and the following relation is satisfied when an optimum exposure is accomplished:

$$Ev=Lv$$

Furthermore, 1/T is equal to $2^{Tv}$, wherein T is a shutter speed, and f-number$^2$ is equal to $2^{Av}$.

In addition, an exposure value (Ev) is related to a brightness value (Bv) representing a luminance of an image to be photographed as expressed by an equation:

$$Bv=Ev-Sv=(Av+Tv)-Sv$$

wherein the ISO sensitivity value (Sv) represents a sensitivity of the film or the imaging device used. Thus, if the aperture value (Av) is a constant number, the brightness value (Bv) is available with the combination of a given time value (Tv) and a ISO sensitivity value (Sv). In another word, an optimum exposure can be obtained by setting a time value (Tv) in combination with a ISO sensitivity value (Sv) in accordance with a luminance (brightness) of an image to be photographed. Therefore, the Ev diagram could be called a Bv diagram theoretically. However, because the term "Bv diagram" is not common, the term "Ev diagram" is used in the following description.

Figure 4:
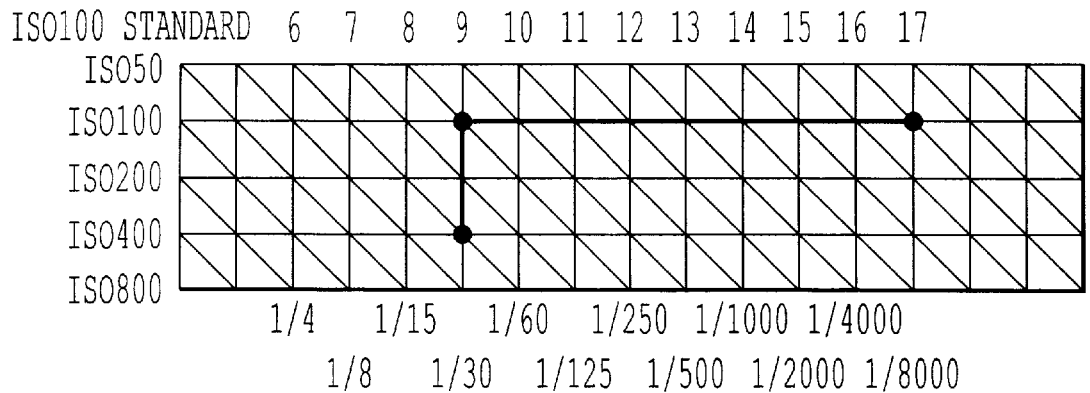
FIG. 4 is an exposure value (Ev) diagram which is utilized for an automatic exposure control when the camera is operated in a monitoring mode.

Monitoring Mode:

FIG. 4 is an exposure value (Ev) diagram for use in the AE control operation in the monitoring mode, i.e., when displaying an image to be photographed in the display panel 122 before actually photographing the image. The diagram covers the whole range of the focal length of the lens system 101. In FIG. 4, the ISO sensitivity is determined in accordance with the sensitivity of the CCD 103 and the gain level set at the VG amplifier 105. The ISO sensitivity is defined as "100" when the gain of the VG amplifier 105 that enables the CCD 103 to output an optimum image signal to the IPP 107 is 0 dB or the control voltage is 0.3 V in FIG. 3. The ISO sensitivity is increased from 100 to 200 by increasing the gain for the VG amplifier 105 from 0 dB to 6 dB and from 200 to 400 by increasing the gain for the VG amplifier 105 from 6 dB to 12 dB.

In FIG. 4, when the exposure value (Ev) is in the range from 9 to 17, the shutter speed is changed in the range from 1/30 of a second to 1/8000 of a second for an optimum exposure. When an image to be photographed is dark and the exposure value (Ev) is less than 9, the shutter speed is kept at 1/30 of a second and the gain of the VG amplifier 105 is increased by the amount corresponding to two steps of the exposure value (Ev) at most and thereby the image of the photograph is displayed with an optimum brightness in the display panel 122. When the exposure value (Ev) is 8, the gain of the VG amplifier 105 is increased up to 6 db which is equivalent to increasing the ISO sensitivity from 100 to 200, and when the exposure value (Ev) is 7 the gain of the VG amplifier 105 is increased up to 12 db which is equivalent to increasing the ISO sensitivity from 100 to 400. In the monitoring mode, when the lens system 101 includes a wide angle lens, even when the exposure value is in a range requiring a shutter speed slower than a criterion shutter speed for not causing blurring of a photograph in the wide angle lens system (i.e., $1/60$ of a second), if the exposure value is in the range requiring the shutter speed faster than above $1/30$ of a second, the gain of the VG amplifier 105 will not be increased. Likewise, when the lens system 101 includes a telephoto lens, even when the exposure value is in a range requiring a shutter speed slower than a criterion shutter speed for not causing blurring of a photograph in the telephoto lens system (i.e., $1/250$ of a second), if the exposure value is in the range requiring the shutter speed faster than above $1/30$ of a second, the gain of the VG amplifier 105 will not be increased. Thus, in the monitoring mode, increasing of the gain of the VG amplifier 105 is prohibited in a range requiring a shutter speed faster than $1/30$ of a second, and thereby an error in the automatic exposure control, focusing control or white balancing control operations, which may be caused by increasing of the gain of the VG amplifier 105, is avoided.

Figure 5:
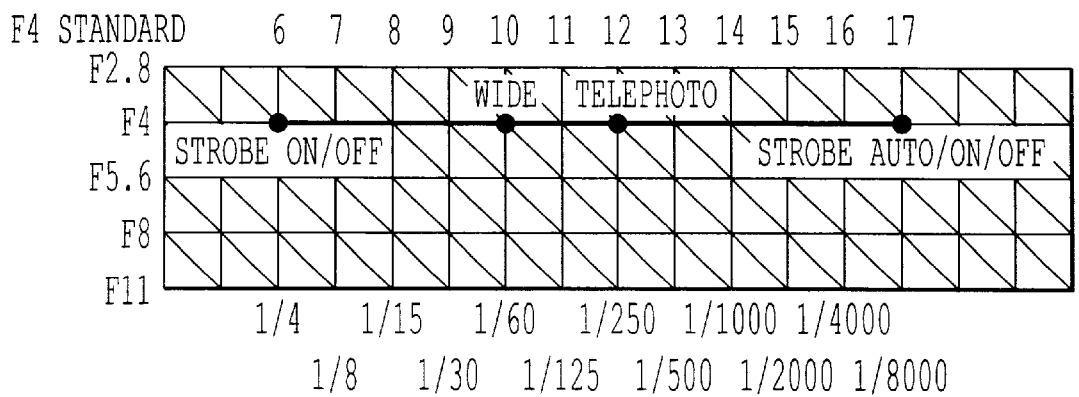
FIG. 5 is an exposure value (Ev) diagram which is utilized for an automatic exposure control in a normal photographing mode.

Normal Photographing Mode:

FIG. 5 is an exposure value (Ev) diagram for the normal photographing mode, where the ISO sensitivity of the CCD 103 is set to 100. In the normal photographing mode, even when the exposure value (Ev) is less than 9, the gain of the VG amplifier 105 is not increased and instead the shutter speed is changed to accomplish an optimum exposure. When the exposure value (Ev) is less than 9, the shutter speed is set to $1/30$ of a second or slower. The shutter speeds slower than $1/30$ of a second are called a "long-shutter" and may cause blurring of a photograph if the camera is moved when the photograph is taken. When the shutter speed is $1/500$ of a second or faster, because one step of the electronic controlled shutter speed is extremely short, such as 63.55 microseconds, the shutter is likely to generate a quantization error, which may cause a deviation from an optimum exposure. Therefore, the camera 100 is adapted to compensate the quantization error with the gain of the VG amplifier 105 by the amount corresponding to one step of the exposure value (Ev) at most.

When an automatic strobe flashing mode is set, when the exposure value (Ev) is less than a predetermined value, the shutter speed is maintained at the predetermined speed and a strobe is flashed. Specifically, in this embodiment, as illustrated in FIG. 5, when a wide angle lens is used, when the shutter speed is $1/60$ of a second and slower, the shutter speed is maintained at $1/60$ of a second and the strobe is flashed. When a telephoto lens is used, when the shutter speed is $1/250$ of a second and slower, the shutter speed is maintained at $1/250$ and the strobe is flashed. When a strobe-off mode is set, the strobe is not flashed and instead the shutter speed is slowed up to $1/4$ of a second. When a strobe-on mode is set, a strobe is flashed regardless of the shutter speed.

Figure 6:
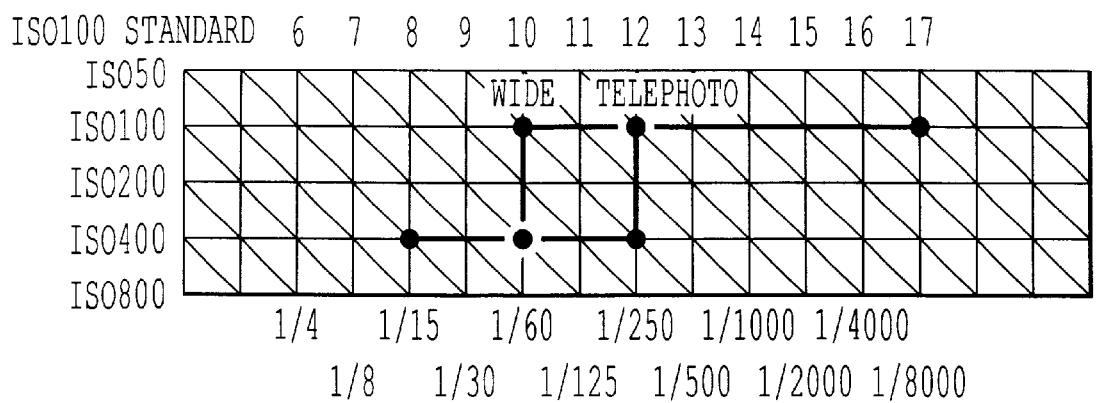
FIG. 6 is an exposure value (Ev) diagram which is utilized for an automatic exposure control in a blur avoiding photographing mode.

Blur Avoiding Photographing Mode:

FIG. 6 is an exposure value (Ev) diagram for the blur avoiding photographing mode, where the ISO sensitivity of the CCD 103 is set to 100. The diagram applies not only to the lens system 101 having a standard focal length but also to the lens system 101 having a focal length for wide-angle or telephoto photography. The gain of the VG amplifier 105 is increased by the amount corresponding to two steps of the exposure value (Ev) at most to avoid blurring of a photograph due to movement of the camera 100 when the exposure value (Ev) is 10 or less when the wide angle lens system 101 is used, and when the exposure value (Ev) is 12 or less when the telephoto lens system 101 is used.

When the lens system 101 includes a wide-angle lens, when the exposure value (Ev) is between 10 to 17, the shutter speed is changed in the range from $1/60$ of a second through $1/8000$ of a second for an optimum exposure. When the exposure value (Ev) is between 8 to 10, the shutter speed is fixed at $1/60$ of a second and the gain of the VG amplifier 105 is changed in the range from the ISO sensitivity 100 to the ISO sensitivity 400. When the exposure value (Ev) is less than 8, the shutter speed is changed in the range slower than $1/15$ of a second with the ISO sensitivity being fixed at 400.

When the lens system 101 includes a telephoto lens, when the exposure value (Ev) is between 12 to 17, the shutter speed is changed in the range from $1/250$ of a second to $1/8000$ of a second for an optimum exposure. When the exposure value (Ev) is between 10 to 12, the shutter speed is fixed at $1/250$ of a second and the gain of the VG amplifier 105 is changed in the range from the ISO sensitivity 100 to the ISO sensitivity 400. When the exposure value (Ev) is less than 10, the gain of the VG amplifier 105 is fixed at the ISO sensitivity 400 and the shutter speed is changed in the range slower than $1/60$ of a second.

As described above, the point of the exposure value (Ev) to start increasing the gain of the VG amplifier 105 for correcting the amplitude of signals output from the CCD 103 is 10 for the wide angle lens, and 12 for the telephoto lens, and the end point of the exposure value (Ev) with the increased gain of the VG amplifier 105 up to 400 is 8 and 10 respectively. The reason why the beginning point of the exposure value (Ev), to increase the gain of the VG amplifier 105 for the telephoto lens, is higher than the for the wide angle lens is that the degree of blurring of a photograph due to movement of the camera is proportional to the focal length of the lens system 101. Furthermore, the high gain of the VG amplifier 105 sometimes causes noise that deteriorates an image quality. Therefore, the beginning point of the exposure value (Ev) to increase the gain of the VG amplifier 105 is set at a highest possible point for each focal length so that the maximum gain is suppressed.

When the lens system 101 includes a standard lens having a standard focal length, i.e., a focal length between that of a wide angle lens and a telephoto lens, the point of the exposure value (Ev) to start increasing the gain of the VG amplifier 105 is set in proportion to the focal length for the other lens system 101 including a wide angle lens or a telephoto lens. In this embodiment, the beginning point of the exposure value to start increasing the gain of the VG amplifier 105 is 11 and the end point of the exposure value with the increased gain of the VG amplifier 105 up to ISO 400 is 9. That is, when the exposure value (Ev) is 11 or more, the shutter speed is changed in the range $1/125$ of a second and above for an optimum exposure. When the exposure value (Ev) is between 9 to 11, the shutter speed is fixed at $1/125$ of a second and the gain of the VG amplifier 105 is changed in the range from the ISO sensitivity 100 to 400. When the exposure value (Ev) is less than 9, the gain of the VG amplifier 105 is fixed at the ISO sensitivity 400 and the shutter speed is changed in the range slower than $1/30$ of a second.

Next, a method of setting a blur avoiding photographing mode is described. FIGS. 7 through 10 are diagrams illustrating an example of an operation mode setting screen displayed on the display panel 122. The operation panel 123 (FIG. 1) has at least a button marked with a triangle and a button marked with an inverse triangle for setting the blur avoiding photographing mode and the normal photographing mode, a shutter release button for releasing the shutter, and a button marked with "DATE" for setting date and time (not shown). The shutter release button has two steps for activating functions, a first step to activate an automatic exposure control and an automatic focusing control, and a second step to release the shutter for photographing. When both the triangle-marked button and the DATE-marked button are simultaneously depressed, the CPU 121 displays an operation mode setting screen on the display panel 122. When the triangle-marked-button is depressed, the display panel 122 displays a message "NORMAL" indicating that the normal photographing mode is selected. Furthermore, each time when the triangle-marked button is depressed, the display panel 122 displays the messages, "GAIN LEVEL UP 0.5,""GAIN LEVEL UP 1.0,""GAIN LEVEL UP 1.5, ""GAIN LEVEL UP 2.0" and "GAIN LEVEL UP 2.5" in sequence, indicating that the blur avoiding photographing mode with a respective gain level is selected, respectively. When the inverse triangle-marked button is depressed, the display panel 123 displays the above messages in reverse sequence.

When the blur avoiding photographing mode is set as above and when the shutter release button is depressed to the first step, the display panel 122 displays messages, as described below, according to the focal length of the lens system 101 and the exposure value (Ev).

Figure 7:
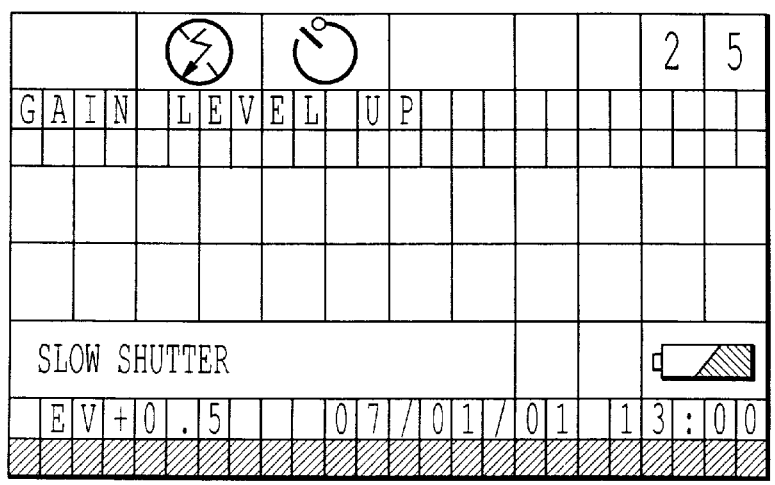
FIG. 7 is a diagram illustrating a displayed image of a display panel when the camera is operated in the blur avoiding photographing mode.
Figure 8:
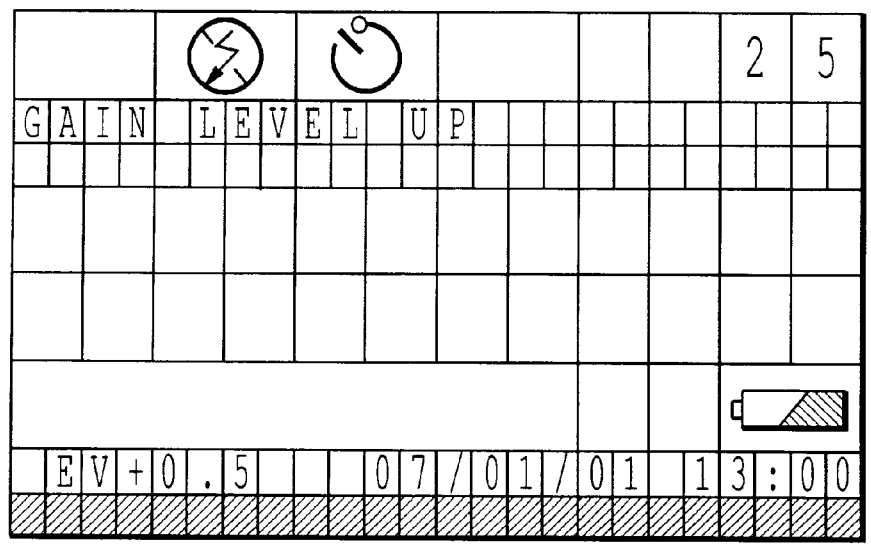
FIG. 8 is a diagram illustrating another displayed image of the display panel in the blur avoiding photographing mode.

When the exposure value (Ev) is between 6 to 8 with a wide-angle lens, the messages "GAIN LEVEL UP" and "SLOW SHUTTER" are displayed on the display panel 122 as shown in FIG. 7. When the exposure value (Ev) is between 6 to 9 with a standard lens, or between 6 to 10 with a telephoto lens, the same messages are shown as well. When the exposure value (Ev) is between 8 to 10 with the wide angle lens, or between 9 to 11 with the standard lens, or between 10 to 12 with the telephoto lens, the message "GAIN LEVEL UP" is displayed as shown in FIG. 8. When the exposure value (Ev) is more than 10 with the wide angle lens, more than 11 with the standard lens, or more than 12 with the telephoto lens, the messages "GAIN LEVEL UP" and "SLOW SHUTTER" are not displayed on the display panel 122 as in FIG. 9. Thus, the display panel 122 displays the message indicating that the gain of the VG amplifier 105 is increased as the gain of the VG amplifier 105 is increased.

Figure 10:
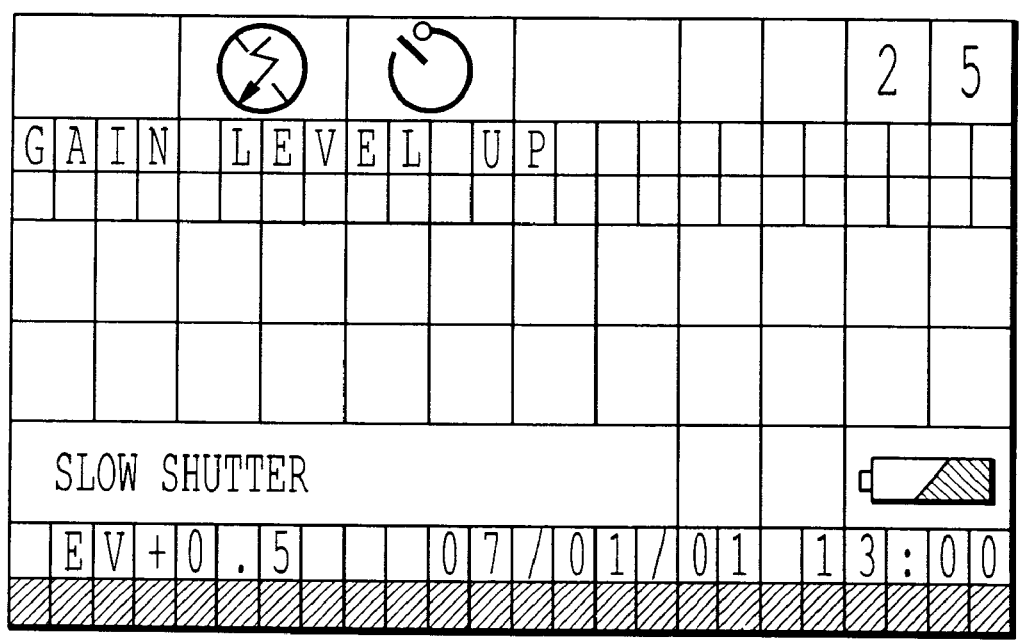
FIG. 10 is a diagram illustrating a displayed image of the display panel in other modes than the blur avoiding photographing mode.

In the normal photographing mode, when the exposure value (Ev) is between 6 to 10 with the wide-angle lens, the message of "SLOW SHUTTER" is displayed on the display panel 122 as shown in FIG. 10. When the exposure value (Ev) is between 6 to 11 with the standard lens, or between 6 to 12 with the telephoto lens, the message "SLOW SHUTTER" is also displayed.

Figure 9:
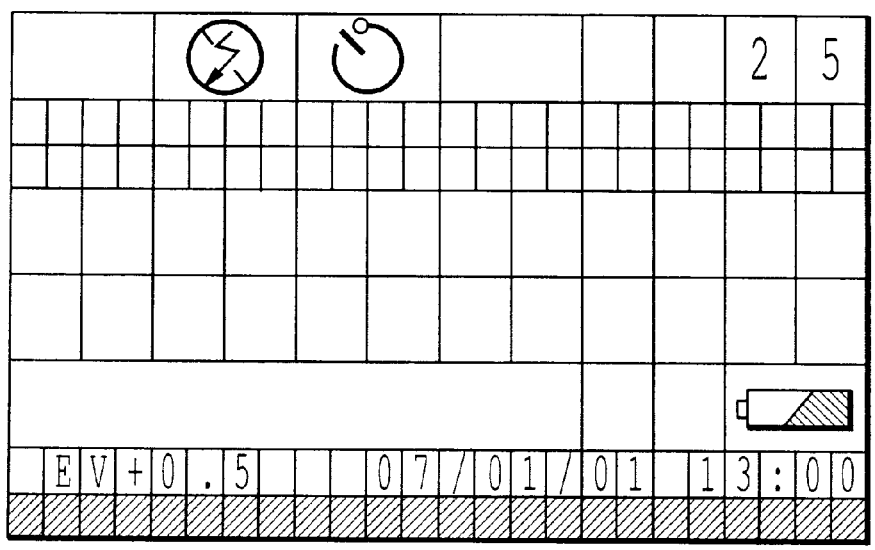
FIG. 9 is a diagram illustrating still another displayed image of the display panel in the blur avoiding photographing mode.

When the exposure value (Ev) is more than 10 with the wide-angle lens, or more than 11 with the standard lens, or more than 12 with the telephoto lens, neither the "GAIN LEVEL UP" nor the "SLOW SHUTTER" message is displayed on the display panel 122 as illustrated in FIG. 9.

As described above, in a digital camera of the present invention, in the blur avoiding photographing mode, when an exposure value is in a range requiring a shutter speed slower than a criterion shutter speed for not causing blurring of a photograph even when the camera is moved when the photograph is taken, the shutter speed is maintained at the criterion shutter speed for not causing blurring of the photograph even when the camera is moved and the CPU 121 automatically increases the gain of the VG amplifier 105 such that the amplitude of signals representing an image to be photographed is increased to a predetermined level for an optimum exposure. Thus, blurring of a photograph due to movement of the camera during taking of the photograph is avoided. In an ordinary camera that uses photographic film, when an image to be photographed by the camera is dark and if a film having a low sensitivity is used, the shutter speed must be made slow for an optimum exposure, and consequently blurring of a photograph due to movement of the camera is inevitable. Therefore, in such a case, a high sensitivity film is used instead of the low sensitivity film and the shutter speed is kept at a speed not causing blurring of a photograph due to movement of the camera when the photograph is taken. The digital camera of the present invention accomplishes the same effect as changing a film to a high sensitivity film in ordinary cameras so as to maintain the shutter speed at a speed not causing blurring of a photograph even when the camera is moved when the photograph is taken, by means of increasing the gain of the VG amplifier 105 to a predetermined level, such that the amplitude of signals representing an image to be photographed are set for an optimum exposure. Moreover, increasing the gain of the VG amplifier 105, which corresponds to changing of the film in ordinary cameras, is automatically done in accordance with the brightness of an image to be photographed.

Furthermore, in the digital camera of the present invention, as described above, either the blur avoiding photographing mode or the normal photographing mode can be chosen. Therefore, a user can select between photographing an image with the blur avoiding photographing mode, in which the shutter speed is maintained at a speed not causing blurring of a photograph due to movement of the camera, for example, when manually holding the camera, or photographing the image with the normal photographing mode, in which the gain of the VG amplifier 105 is not increased and accordingly the noise level is not increased, for example, when holding the camera in a tripod, thereby accomplishing photographing of the image at a high quality. Furthermore, because the gain level of the VG amplifier 105 can be selected when setting the blur avoiding photographing mode as described above, the user can select an appropriate gain level of the VG amplifier 105 according to the quality level of the photograph desired by the user. As the gain level of the VG amplifier 105 is increased, the noise level of output signals is increased accordingly and thereby the quality of the image, for example, the resolution of the image, is deteriorated. Accordingly, the user may select a relatively lower gain level of the VG amplifier 105 when the user desires to photograph the image at a higher quality.

Still further, when a strobe is used, an automatic increase of the gain of the VG amplifier 105 is not activated, and thereby over-exposure is prevented.

Also, in the monitoring mode, when the lens system 101 includes a wide angle or telephoto lens, an automatic increase of the gain of the VG amplifier 105 is not activated, even when the exposure value is in a range requiring a shutter speed slower than the criterion shutter speed, for not causing blurring of a photograph for the wide angle lens or telephoto lens system, when the exposure value is in the range requiring the shutter speed faster than the slowest shutter speed ($\frac{1}{30}$ of a second) which can be used in the monitoring mode. This enables an accurate automatic exposure control and focusing control operations and a white balancing operation.

Furthermore, in the blur avoiding photographing mode, the display panel 122 displays a message indicating that the gain of the VG amplifier 105 is increased, and thereby an operator can be notified that a lower quality photograph might be produced.

Still further, when the photographing environment is extraordinary dark and the shutter speed is still slower than the predetermined criterion speed for not causing blurring of a photograph, even though the gain of the VG amplifier 105 is increased, the display panel 122 displays a message indicating that the shutter speed is slow, and thereby the operator is properly informed.

Furthermore, the criterion shutter speed for not causing blurring of a photograph can be set according to the focal length of the lens system. Therefore, an appropriate range of the exposure value for increasing the gain of the VG amplifier 105 can be set according to the focal length of the lens system of the camera 100.

The mechanisms and processes set forth in the present description may be implemented using a conventional general purpose microprocessor programmed according to the teachings in the present specification, as will be appreciated to those skilled in the relevant art(s). Appropriate software coding can readily be prepared by skilled programmers based on the teachings of the present disclosure, as will also be apparent to those skilled in the relevant art(s).

The present invention thus also includes a computer-based product which may be hosted on a storage medium and include instructions which can be used to program a microprocessor to perform a process in accordance with the present invention. This storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

This document claims priority and contains subject matter related to Japanese patent application No. 09-336395 filed in the Japanese patent Office on Nov. 19, 1997, the entire contents of which are hereby incorporated by reference.

What is claimed as new and is desired to be secured by Letters Patents of the United States:

1. A digital camera, comprising:

means for setting a shutter speed;

an optical system;

an imaging device which receives a light flux from an object to be photographed, the light flux being passed through the optical system to form an image of the object to be photographed, at the shutter speed set by the shutter speed setting means, and converts the received light flux into an image signal;

a variable gain amplifier that amplifies the image signal output by the imaging device with a variable gain;

means for judging whether the shutter speed set by the shutter speed setting means is slower than a predetermined blur avoiding speed;

means for increasing the gain of the variable gain amplifier to a predetermined value when the judging means judges that the shutter speed set by the shutter speed setting means is slower than the predetermined blur avoiding speed; and means for manually setting a value as the predetermined value for the gain of the variable gain amplifier.

2. The digital camera of claim 1, further comprising a strobe, wherein, when the strobe is flashed, the gain increasing means does not increase the gain of the variable gain amplifier even when the judging means judges that the shutter speed set by the shutter speed setting means is slower than the predetermined blur avoiding speed.

3. The digital camera of claim 1, further comprising means for displaying an image of the image signal for the object, wherein, when the displaying means displays an image of the image signal being output by the imaging device, the gain increasing means does not increase the gain of the variable gain amplifier, even when the judging means judges that the shutter speed set by the shutter speed setting means is slower than the predetermined blur avoiding speed, if the shutter speed is faster than a predetermined blur avoiding speed which is set when the displaying means displays the image of the image signal being output by the imaging device.

4. The digital camera of claim 1, further comprising:

means for displaying messages for an operator; and means for controlling the message displaying means to display a message indicating that the object will be photographed with an increased gain of the variable gain amplifier when the object is photographed with the increased gain of the variable gain amplifier.

5. The digital camera of claim 4, wherein, when the gain of the variable gain amplifier is increased and the object is photographed with a shutter speed slower than the predetermined blur avoiding speed, the message displaying control means displays a message to indicate that the object will be photographed with the shutter speed slower than the predetermined blur avoiding speed.

6. The digital camera of claim 1, wherein the predetermined blur avoiding speed is variable according to a focal length of the optical system.

7. A digital camera, comprising:

means for setting a shutter speed;

an optical system;

an imaging device which receives a light flux from an object to be photographed, the light flux being passed through the optical system to form an image of the object to be photographed, at the shutter speed set by the shutter speed setting means, and converts the received light flux into an image signal;

a variable gain amplifier that amplifies the image signal output by the imaging device with a variable gain;

means for judging whether the shutter speed set by the shutter speed is slower than a predetermined blur avoiding speed;

means for selectively setting a photographing mode to one of:

a blur avoiding photographing mode in which the gain of the variable gain amplifier is increased to a predetermined value when the judging means judges that the shutter speed is slower than the predetermined blur avoiding speed, and a normal photographing mode in which the gain of the variable gain amplifier is not increased even when the judging means judges that the shutter speed is slower than the predetermined blur avoiding speed;

means for increasing the gain of the variable gain amplifier to a predetermined value when the blur avoiding photographing mode is set and when the judging means judges that the shutter speed set by the shutter speed setting means is slower than the predetermined blur avoiding speed; and means for manually setting a value as the predetermined value for the gain of the variable again amplifier.

8. The digital camera of claim 7, further comprising a strobe, wherein, when the strobe is flashed, the gain increasing means does not increase the gain of the variable gain amplifier even when the judging means judges that the shutter speed set by the shutter speed setting means is slower than the predetermined blur avoiding speed.

9. The digital camera of claim 7, further comprising means for displaying an image of the image signal for the object, wherein, when the displaying means displays an image of the image signal being output by the imaging device, the gain increasing means does not increase the gain of the variable gain amplifier, even when the judging means judges that the shutter speed set by the shutter speed setting means is slower than the predetermined blur avoiding speed, if the shutter speed is faster than a predetermined blur avoiding speed which is set when the displaying means displays the image of the image signal being output by the imaging device.

10. The digital camera of claim 7, further comprising:

means for displaying messages for an operator; and means for controlling the message displaying means to display a message indicating that the object will be photographed with an increased gain of the variable gain amplifier when the object is photographed with the increased gain of the variable gain amplifier.

11. The digital camera of claim 10, wherein, when the gain of the variable gain amplifier is increased and the object is photographed with a shutter speed slower than the predetermined blur avoiding speed, the message displaying control means displays a message to indicate that the object will be photographed with the shutter speed slower than the predetermined blur avoiding speed.

12. The digital camera of claim 7, wherein the predetermined blur avoiding speed is variable according to a focal length of the optical system.

13. A method of controlling a digital camera, comprising:

setting a shutter speed;

receiving a light flux from an object to be photographed to form an image thereof at the set shutter speed;

converting the received light flux into an image signal;

amplifying the image signal with a variable gain;

judging whether or not the shutter speed is set slower than a predetermined blur avoiding speed;

manually setting a predetermined value for the variable gain; and increasing the variable gain to the predetermined value when the shutter speed is set slower than the predetermined blur avoiding speed.

14. The method of claim 13, further comprising:

increasing the variable gain even when the shutter speed is set slower than the predetermined blur avoiding speed, when a strobe is flashed.

15. The method of claim 13, further comprising:

displaying an image of the object; and not increasing the variable gain even when the shutter speed is set slower than the predetermined blur avoiding speed, if the shutter speed is set faster than a predetermined blur avoiding speed when the image is displayed.

16. The method of claim 13, further comprising:

displaying a message indicating that the object will be photographed with an increased variable gain when the object is photographed with the increased variable gain.

17. The method of claim 16, further comprising:

displaying a message indicating that the object will be photographed with the shutter speed slower than the predetermined blur avoiding speed, when the variable gain is increased and the object is photographed with a shutter speed set slower than the predetermined blur avoiding speed.

18. The method of claim 13, wherein the predetermined blur avoiding speed is variable according to a focal length of the optical system.

19. A method of controlling a digital camera, comprising:

setting a shutter speed;

receiving a light flux from an object to be photographed to form an image thereof at the set shutter speed;

converting the received light flux into an image signal;

amplifying the image signal with a variable gain;

judging whether or not the shutter speed is set slower than a predetermined blur avoiding speed;

selectively setting a photographing mode to one of:

a blur avoiding photographing mode in which the variable gain is increased to a predetermined value when the shutter speed is set slower than the predetermined blur avoiding speed, and a normal photographing mode in which the variable gain is not increased even when the shutter speed is set slower than the predetermined blur avoiding speed;

manually setting a predetermined value for the variable gain; and increasing the variable gain to the predetermined value when the blur avoiding photographing mode is set and when the shutter speed is set slower than the predetermined blur avoiding speed.

20. The method of claim 16, further comprising:

increasing the variable gain even when the shutter speed is set slower than the predetermined blur avoiding speed, when a strobe is flashed.

21. The method of claim 19, further comprising:

displaying an image of the object; and not increasing the variable gain even when the shutter speed is set slower than the predetermined blur avoiding speed, if the shutter speed is set faster than a predetermined blur avoiding speed when the image is displayed.

22. The method of claim 19, further comprising:

displaying a message indicating that the object will be photographed with an increased variable gain when the object is photographed with the increased variable gain.

23. The method of claim 22, further comprising:

displaying a message indicating that the object will be photographed with the shutter speed slower than the predetermined blur avoiding speed, when the variable gain is increased and the object is photographed with a shutter speed set slower than the predetermined blur avoiding speed.

24. The method of claim 19, wherein the predetermined blur avoiding speed is variable according to a focal length of the optical system.

25. A computer readable medium storing computer instructions for controlling a digital camera, by performing the steps of:

setting a shutter speed;

receiving a light flux from an object to be photographed to form an image thereof at the set shutter speed;

converting the received light flux into an image signal;

amplifying the image signal with a variable gain;

judging whether or not the shutter speed is set slower than a predetermined blur avoiding speed;

manually setting a predetermined value for the variable gain; and increasing the variable gain to the predetermined value when the shutter speed is set slower than the predetermined blur avoiding speed.

26. The computer readable medium of claim 25, further storing computer instructions for performing the step of increasing the variable gain even when the shutter speed is set slower than the predetermined blur avoiding speed, when a strobe is flashed.

27. The computer readable medium of claim 25, further storing computer instructions for performing the steps comprising:

displaying an image of the object; and not increasing the variable gain even when the shutter speed is set slower than the predetermined blur avoiding speed, if the shutter speed is set faster than a predetermined blur avoiding speed when the image is displayed.

28. The computer readable medium of claim 25, further storing computer instructions for performing the step of displaying a message indicating that the object will be photographed with an increased variable gain when the object is photographed with the increased variable gain.

29. The computer readable medium of claim 28, further storing computer instructions for performing the step of displaying a message indicating that the object will be photographed with the shutter speed slower than the predetermined blur avoiding speed, when the variable gain is increased and the object is photographed with a shutter speed set slower than the predetermined blur avoiding speed.

30. The computer readable medium of claim 25, wherein the predetermined blur avoiding speed is variable according to a focal length of the optical system.

31. A computer readable medium storing computer instructions for controlling a digital camera, by performing the steps of:

setting a shutter speed;

receiving a light flux from an object to be photographed to form an image thereof at the set shutter speed;

converting the received light flux into an image signal;

amplifying the image signal with a variable gain;

judging whether or not the shutter speed is set slower than a predetermined blur avoiding speed;

selectively setting a photographing mode to one of:

a blur avoiding photographing mode in which the variable gain is increased to a predetermined value when the shutter speed is set slower than the predetermined blur avoiding speed, and a normal photographing mode in which the variable gain is not increased even when the shutter speed is set slower than the predetermined blur avoiding speed;

manually setting a predetermined value for the variable gain; and increasing the variable gain to the predetermined value when the blur avoiding photographing mode is set and when the shutter speed is set slower than the predetermined blur avoiding speed.

32. The computer readable medium of claim 31, further storing computer instructions for performing the step of increasing the variable gain even when the shutter speed is set slower than the predetermined blur avoiding speed, when a strobe is flashed.

33. The computer readable medium of claim 31, further storing computer instructions for performing the steps comprising:

displaying an image of the object; and not increasing the variable gain even when the shutter speed is set slower than the predetermined blur avoiding speed, if the shutter speed is set faster than a predetermined blur avoiding speed when the image is displayed.

34. The computer readable medium of claim 31, further storing computer instructions for performing the step of displaying a message indicating that the object will be photographed with an increased variable gain when the object is photographed with the increased variable gain.

35. The computer readable medium of claim 34, further storing computer instructions for performing the step of displaying a message indicating that the object will be photographed with the shutter speed slower than the predetermined blur avoiding speed, when the variable gain is increased and the object is photographed with a shutter speed set slower than the predetermined blur avoiding speed.

36. The computer readable medium of claim 31, wherein the predetermined blur avoiding speed is variable according to a focal length of the optical system.

* * * * *